Nov. 4, 1941.   R. A. CARTER   2,261,223
THEATER SEAT ILLUMINATING MEANS
Filed Nov. 25, 1940   3 Sheets-Sheet 1
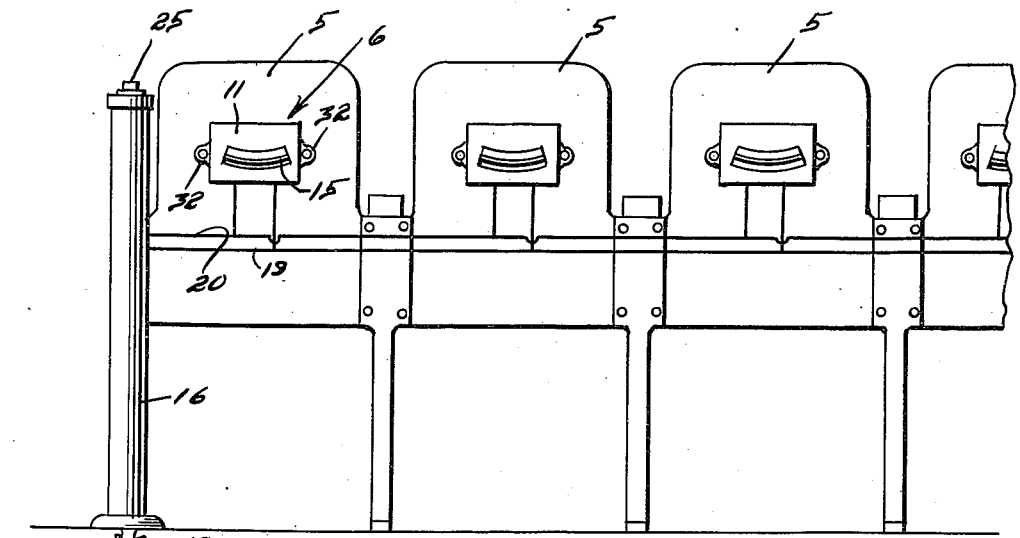
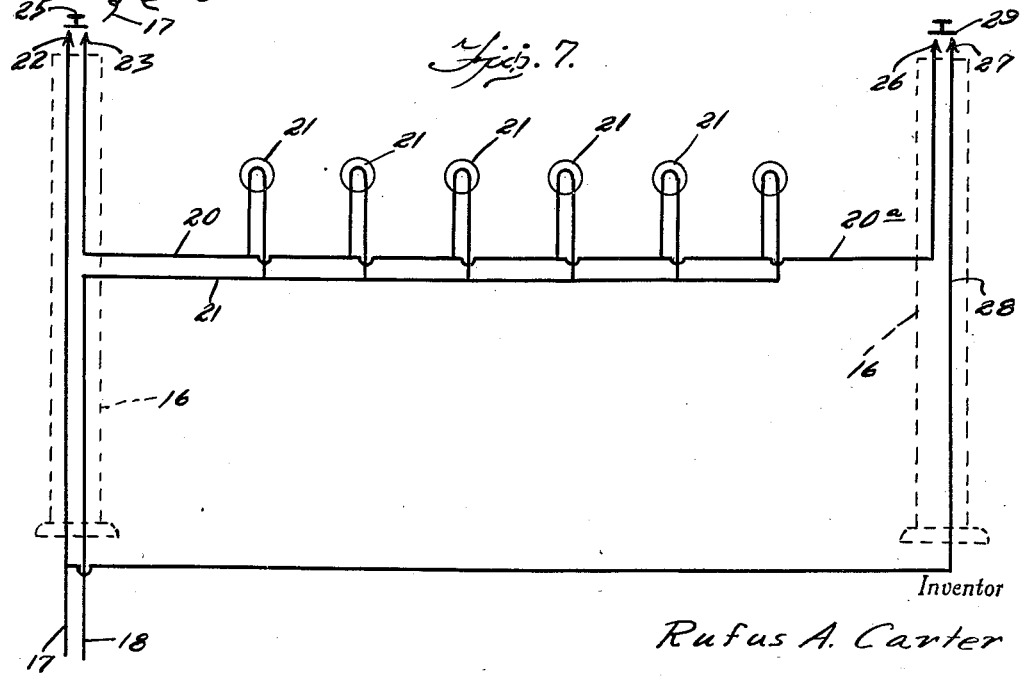
Inventor
Rufus A. Carter
By Clarence A. O'Brien
Attorney

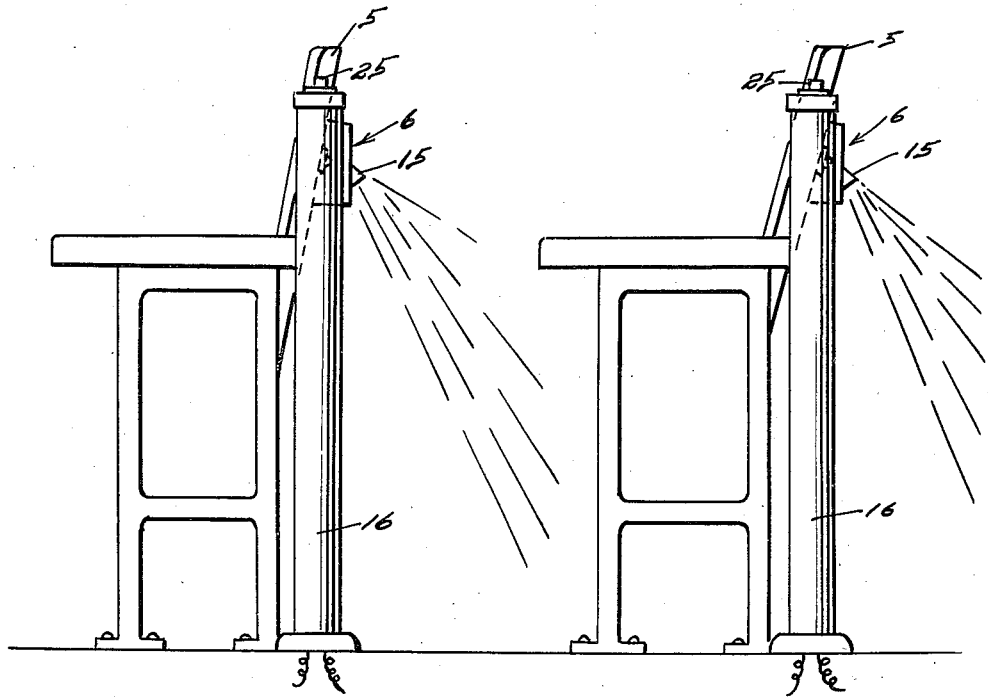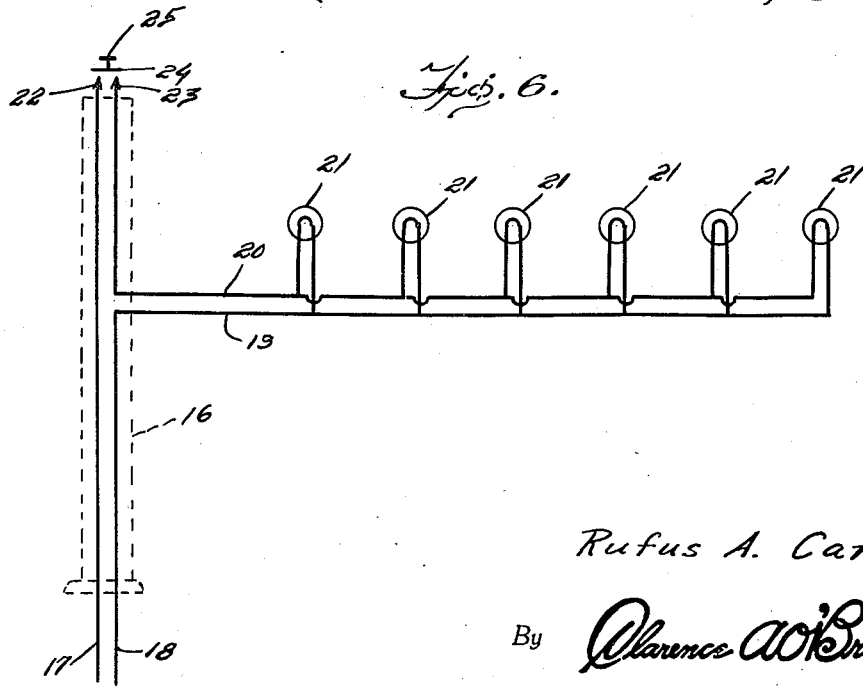

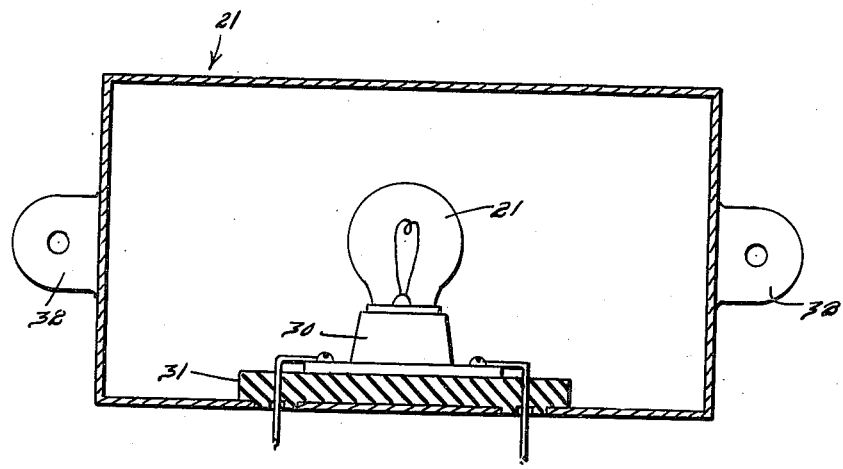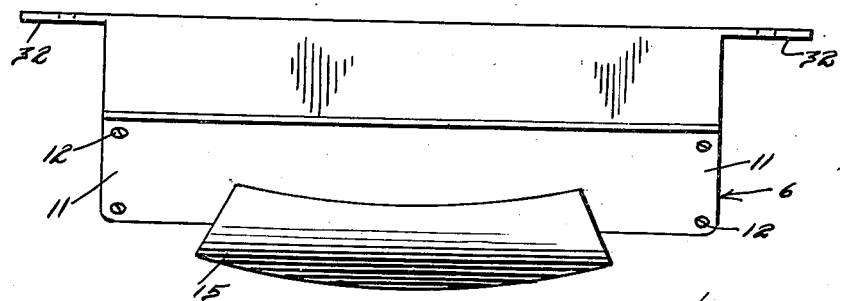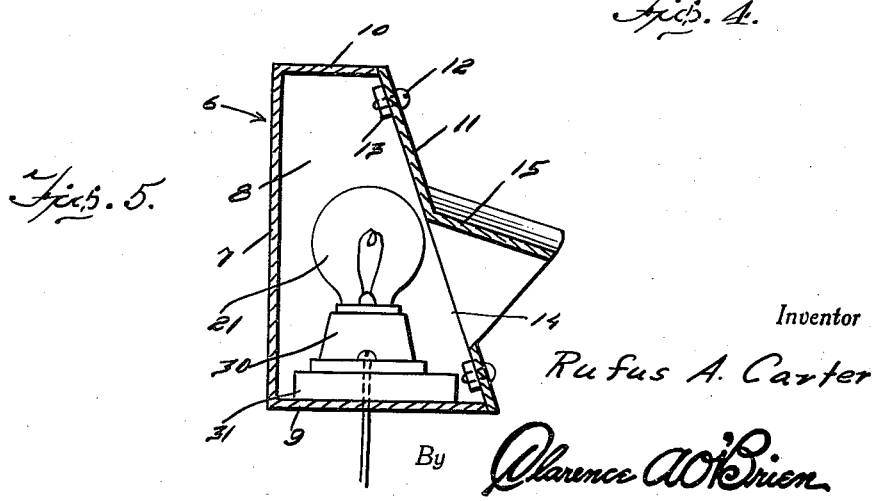

Patented Nov. 4, 1941

2,261,223

UNITED STATES PATENT OFFICE 2,261,223

THEATER SEAT ILLUMINATING MEANS

Rufus A. Carter, Lenoir City, Tenn., assignor of one-half to Mont Weaver, Collinsville, Ala.

Application November 25, 1940, Serial No. 367,084

2 Claims. (Cl. 240—4)

This invention relates to new and useful improvements in unoccupied theater seat illuminating means whereby a theater patron can easily locate his seat.

The principal object of the present invention is to provide illuminating means for theater seats whereby a row of seats can be mildly illuminated as by an usher to the end that a patron can locate his particular reserved seat, and an usher can illuminate a row of seats to ascertain whether there are any unoccupied seats that may be filled by waiting patrons.

Other objects and advantages of the invention will become apparent to the reader of the following specification:

In the drawings:

Figure 1 represents a fragmentary rear elevational view of the row of theater seats showing the illuminating means on the seat backs.

Figure 2 is an end elevational view showing the end seat of adjacent seat rows and corresponding end posts.

Figure 3 is a vertical sectional view through one of the lamp boxes.

Figure 4 is a top plan view of one of the lamp boxes.

Figure 5 is a vertical transverse sectional view through one of the lamp boxes.

Figure 6 is a diagrammatic view showing a single type lighting system.

Figure 7 is a diagrammatic view disclosing a duplex system.

Referring to the drawings wherein like numerals designate like parts, it may be seen that numeral 5 denotes seat backs in a row of theater seats and on the back side of each of these backs 5 is a lamp box generally referred to by numeral 6.

Each of these lamp boxes consists of a back wall 7, in walls 8, bottom and top walls 9 and 10 and a sloping front wall 11, the sloping front wall being attached to the front side of the lamp box by screws 12 extending into lugs 13 projecting from the end walls 8.

The front wall 11 has an opening 14 therein from the upper edge portion of which projects a light deflector or visor 15. This visor is of longitudinal arcuate shape and serves to deflect the light downwardly in the manner substantially shown in Figure 2.

At one end of each row of seats there is a hollow post 16, or if a double type of electric system is employed as shown in Figure 7, a post 16 is provided at each end of each row of seats.

In respect to the single type of system shown in Figure 2, wires 17 and 18 extend upwardly into the post 16 from a source of current. The wire 18 is interrupted by wires 19 and 20 which extend to the various boxes 6 and across which lamps 21 in said boxes 6 are connected in parallel.

The upper end of the wires 17 and 18 connect to corresponding contacts 22 and 23 which when bridged by a contactor 24 actuated by a push button 25 closes the circuit to energize each of the lamps. The contactor 24 and push button 25 form parts of the usual push button type switch spring biased to opening position.

Obviously to make the system double acting as shown in Figure 7, the wire 20 can be extended as at 20ª to the other post 16 and upwardly therein to a contact 26. This contact 26 is adjacent a contact 27 from which a conductor 28 extends downwardly in the corresponding post and in a convenient way over to the other post 16 to connect to the conductor 17. Thus, either the push button carrying the contactor 29 or the push button 25 can be operated to energize the lamps 21.

As can be seen in Figure 3, the lamps 21 are carried by sockets 30 which in turn are mounted on blocks 31 of insulation in the lamp boxes. It is preferable that the lamp boxes have apertured ears 32 through which suitable securing means can be disposed for securing the lamp boxes to the back side of the seat backs 5.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

1. In combination a row of seats having backs, a post at one end of the row, lamp boxes on the backs of the seats each of the lamp boxes being provided with an opening for means for deflecting light from the box at the opening in a downward direction, lamps in the boxes, a switch on the post, and a normally open circuit for said lamps closed through operation of said switch.

2. In combination, a row of seats, a pair of hollow posts at opposite ends of the row, respectively, lamp boxes on the backs of said seats including deflectors for deflecting light rays downwardly and rearwardly, electric lamps in said boxes, respectively, a normally open circuit for said lamps including terminal wires in said posts, and a pair of switches on top of said posts, respectively, for closing circuit through said terminal wires at opposite ends of the row of seats, selectively.

RUFUS A. CARTER.